United States Patent [19]
Matsunaga et al.

[11] Patent Number: 5,764,455
[45] Date of Patent: Jun. 9, 1998

[54] MAGNETIC HEAD

[75] Inventors: Toru Matsunaga; Astushi Suzuki; Takashi Tamura; Akira Urai, all of Miyagi, Japan

[73] Assignee: Sony Corporation, Tokyo, Japan

[21] Appl. No.: 789,381

[22] Filed: Jan. 28, 1997

[30] Foreign Application Priority Data

Jan. 29, 1996 [JP] Japan ................... 8-012957

[51] Int. Cl.$^6$ ................... G11B 5/133
[52] U.S. Cl. ................... 360/127
[58] Field of Search ................... 360/125, 127

[56] References Cited

U.S. PATENT DOCUMENTS 5,515,222  5/1996  Kumagai et al. ............ 360/127

*Primary Examiner*—Robert S. Tupper
*Attorney, Agent, or Firm*—Hill & Simpson

[57] ABSTRACT

This invention provides a magnetic head suitably used for replay because of its giving a high output with a low noise. A magnetic head suitable for replay is provided which is made of a pair of magnetic cores 1 and 2 facing each other with a magnetic gap $g_1$, in between and composed of composite ferrites consisting of monocrystal ferrites 9 and 11, and polycrystal ferrites 10 and 12 each containing 52–54 mol % of $Fe_2O_3$, 24–26 mol % of ZnO and 20–24 mol % of MnO. Further, the monocrystal ferrites 9 and 11 are allowed to take the same orientation with a so-called VHS direction. Furthermore, the fusion glass 3 to bond the magnetic cores 1 and 2 is allowed to have a linear thermal expansion coefficient less by $20\times10^{-7}$–$26\times10^{-7}$ than that of the composite ferrites composing the magnetic cores 1 and 2, at temperatures from 100° to 350° C.

1 Claim, 4 Drawing Sheets

MAGNETIC HEAD

BACKGROUND OF THE INVENTION

1. Field of the Invention

This invention relates to a magnetic head which is mainly used for a magnetic recording/replay system such as a video tape recorder (to be referred to as VTR hereinafter). More specifically, this invention relates to a magnetic head which, giving a high output with a low noise, can be suitably used for replay as the type of magnetic head wherein recording and replay are separately operated. This feature can be achieved by restricting the composition of the ferrite members of the magnetic cores within a certain limit.

2. Description of the Related Art

Under the influence of recent technological innovations VTR has increasingly become smaller in size, lighter in weight and higher in quality. In line with this, tendency towards a higher recording density and digitization of recording/replay signals has been further accelerated. To produce a high performance system incorporating such new features capable of reproducing images with a high quality and reliability, designers often try to separate the magnetic head into two parts, one for recording and the other for replay, instead of using the same head for both functions as is observed in the conventional system, and to specify the best conditions separately for each of them. If recording signals were digitized, they would become higher in frequency, and then errors in the read/write of individual signals would interfere more severely with the display quality of the system. To meet such situations, it is necessary more than ever to improve the recording and replay performance independently.

When compared with the recording head, it is more difficult to improve the capability of the replay head. This is partly because optimization of the replay head poses many difficulties; its configuration alone is restricted by a number of factors such as track width and gap distance.

Further, when a monocrystal material is used as the substance of the magnetic cores of the replay head, the head is liable to develop noises when coming in contact with a recording medium. Even if a polycrystal material is used instead for the same purpose, the resulting head will present with a number of problems: the head gives a low output, tends to wear, and does not allow fine machining which is required for achievement of precise track width and depth.

To circumvent such difficulties, the magnetic head of this invention is composed of, for example, composite ferrites consisting of monocrystal and polycrystal materials, so as to cancel out the disadvantages which would arise if those materials were used alone.

Even though this head employs composite ferrites effective for reducing noises which may take place when it comes in contact with a recording medium, it is not entirely free from noises, because its surface coming in contact with a recording medium is made of a monocrystal material.

The conventional magnetic head made of a composite ferrite has been used both for recording and replay, or prepared as a metal-in-gap type (MIG). Therefore, the material, being prepared so as to have a high saturation level of magnetization or Bs, and a large linear expansion coefficient α, is susceptible to changes in temperature and ready to develop mechanical deformations.

When the magnetic head with such characteristics is exposed to a magnetic field, it is ready to develop deformations in proportion with its saturated level of magnetization or Bs which has been designed to have a big value. This may also contribute to enhanced production of noises arising from contact.

Particularly, as signals come to have a higher frequency band, the permeability of the ferrite to them becomes smaller, and the proportion of the contact noise in the total C/N becomes too large to be ignored.

As an alternative means for replay, a magnetic head having a laminated structure composed of metal magnetic films has been employed instead of the magnetic head made of ferrites. This type of magnetic head, however, is problematic in mechanical durability and productivity which, though, vary depending on the material of ceramics and crystallized glasses used in combination with the metal magnetic films.

SUMMARY OF THE INVENTION

The product of this invention has been proposed as a remedy of the problems inherent in conventional systems. Thus, this invention intends to provide a magnetic head which can be most suitably used as a magnetic replay head for a magnetic recording/replay system such as VTR, because of its giving a high output with a low noise.

To attain above object, the present inventors had studied the problems minutely, found that, when the use of the magnetic head is restricted to replay, the magnetic material composing the magnetic cores of the magnetic head can have a lower Bs than does the conventional magnetic head, and achieved this invention.

The magnetic head the present invention provides is constituted by a pair of magnetic cores facing each other with a magnetic gap in between and bonded together with fusion glass, which are made of ferrites containing 52–54 mol % of $Fe_2O_3$, 24–26 mol % of ZnO, and 20–24 mol % of MnO, and is specially adapted for replay.

The magnetic core should be preferably made of a composite ferrite produced by joining a monocrystal ferrite and a polycrystal ferrite together, and the gap-forming part should preferably be composed of the monocrystal ferrite.

The monocrystal ferrite member of the magnetic core should preferably have a so-called VHS orientation wherein the surface of the monocrystal ferrite in contact with a recording medium is represented by a surface (211), the contacting surface with the magnetic gap in between is represented by a surface (111) or its surrounds, and the main magnetic flux passing surface is represented by a surface (110) or its surrounds.

Furthermore, the fusion glass for bonding a pair of magnetic cores together should preferably have a linear thermal expansion coefficient less by $20 \times 10^{-7}$–$26 \times 10^{-7}$ than that of the ferrite members constituting the magnetic cores at temperatures ranging from 100°–350° C.

With the magnetic head of this invention, the magnetic cores, because of being composed of ferrites containing 52–54 mol % of $Fe_2O_3$, 24–26 mol % of ZnO and 20–24 mol % of MnO, can have a lower saturation level of magnetization with smaller magnetic distortions in association. Such composition ensures a sufficient permeability to low frequency bands. With this feature, the magnetic head of this invention can give a high output for replay.

Further, with the magnetic head of this invention, because magnetic cores are made of composite ferrites which have been produced by joining a monocrystal ferrite and a polycrystal ferrite together, the disadvantages inherent in mono- and polycrystal ferrites as described above are canceled out.

and because the monocrystal ferrite undergoes only small magnetic deformations, the contact noise characteristic with a monocrystal ferrite can be further suppressed.

Furthermore, with the magnetic head of this invention, when the surface of the monocrystal ferrite member constituting the composite ferrite is oriented in line with a VHS direction, a still higher output for replay with a lower noise can be ensured.

Still further, with the magnetic head of this invention, when the fusion glass to be used as a bond of ferrites is so chosen as to give an optimal linear expansion coefficient, distortions associated with fusion of the glass can be minimized, which allows a still higher output for replay with a lower noise.

DESCRIPTION OF THE PREFERRED EMBODIMENTS

Examples embodying the present invention will be detailed below with reference to the accompanying drawings.

Figure 1:
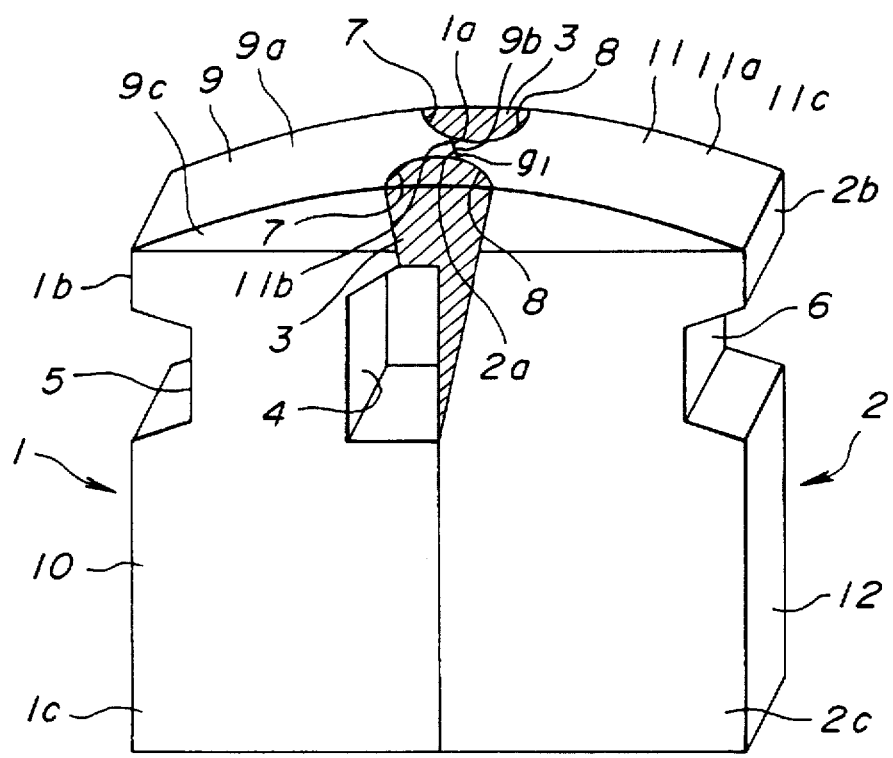
FIG. 1 gives a perspective view of one example of magnetic head according to this invention schematically drawn.
Figure 2:
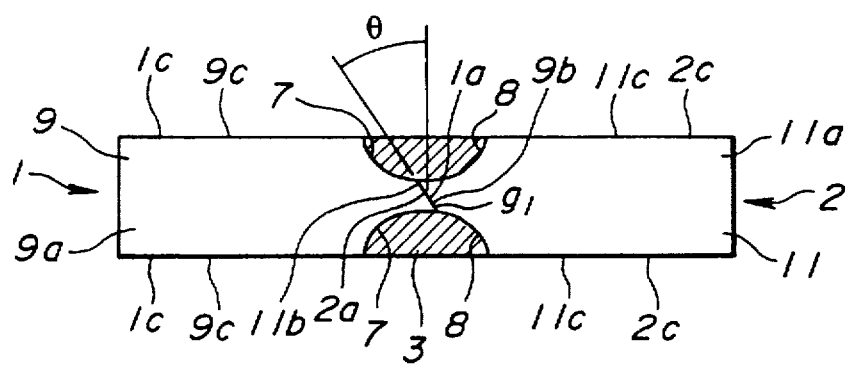
FIG. 2 gives a flat view of the example of magnetic head according to this invention schematically drawn.

The first example of the magnetic head according to this invention, as illustrated in FIGS. 1 and 2, is constituted by a pair of magnetic cores 1 and 2 facing each other with a magnetic gap $g_1$ in between, which has been filled with fusion glass 3 acting as a bond between the two cores.

The magnetic core 1 has, on the same side with the contact surface 1a, a groove 4 rectangular in profile for receiving a coil, while the magnetic core 2 has no such groove for receiving a coil on the same side with the contact surface 2a, and has a surface like letter "T" in profile. On the sides opposite to the contact surfaces 1a and 2a, or on back surfaces 1 band 2b, there are prepared supplementary grooves 5 and 6 respectively for receiving coils. Accordingly, wires are wound through a window formed by the groove 4 and the contact surface 2a, and around the supplementary grooves 5 and 6, to produce necessary coils. Drawing of coils is omitted in FIG. 1.

Both the magnetic cores 1 and 2 have, on the same side with the contact surfaces 1a and 2a, gap-width adjusting grooves 7 and 8 which are used to adjust the distance between the gap-forming portions of the contact surfaces 1a and 2a, or the width of the magnetic gap $g_1$. Troughs are formed when the gap-width adjusting grooves 7 and 8 are united together. Filling the troughs with molten fusion glass 3 unites the pair of magnetic cores 1 and 2 together into a unity.

It should be added here that the gap $g_1$ formed between the two contact surfaces 1a and 2a of the magnetic cores 1 and 2 has an azimuth angle or θ in the figure with respect to the normal to main magnetic flux passing surfaces 1c and 2c or the lateral surfaces of the magnetic cores 1 and 2.

With the magnetic core of this example, the magnetic core 1 is composed of a composite ferrite having a monocrystal ferrite 9 and a polycrystal ferrite 10 united together, while the magnetic core 2 is composed of a composite ferrite having a monocrystal ferrite 11 and a polycrystal ferrite 12 united together. The magnetic cores 1 and 2 has a magnetic gap $g_1$, in between, and are so constructed that their portions carrying the surfaces to come in contact with a recording medium are made of monocrystal ferrites 9 and 11, and the rest is made of polycrystal ferrites 10 and 12.

The monocrystal ferrites 9 and 11, and polycrystal ferrites 10 and 12 constituting the magnetic cores 1 and 2 contain 52–54 mol % of $Fe_2O_3$, 24–26 mol % of ZnO, and 20–24 mol % of MnO, and particularly, the monocrystal ferrites 9 and 11 are allowed to take a so-called VHS orientation: the surfaces 9a and 11a of the monocrystal ferrites in contact with a recording medium (medium contacting surfaces) are represented by a crystal surface(211), the main magnetic flux passing surfaces 9c and 11c are represented by a crystal surface (110) or its surrounds, and the gap-forming surfaces 9b and 11b are represented by a crystal surface (111) or its surrounds.

Further, in the magnetic head of this example, the fusion glass to be used as a bond between the pair of magnetic cores 1 and 2 is so chosen as to give a thermal linear expansion coefficient which is less by $20 \times 10^{-7}$–$26 \times 10^{-7}$ than that of the composite ferrite composing the magnetic cores 1 and 2 at temperatures ranging from 100°–350° C.

With the magnetic head of this example, the magnetic cores 1 and 2, because of being composed of ferrites containing 52–54 mol % of $Fe_2O_3$, 24–26 mol % of ZnO and 20–24 mol % of MnO, can have a lower saturation level of magnetization with smaller magnetic distortions. Further, such composition ensures a sufficient permeability to low frequency bands of magnetic flux. With these features, the magnetic head of this invention can give a high output for replay.

Further, with the magnetic head of this example, because the magnetic cores 1 and 2 are made of composite ferrites which have been composed of monocrystal ferrites 9 and 11, and polycrystal ferrites 10 and 12 having said compositions, the disadvantages inherent in monocrystal ferrites 9 and 11, and in polycrystal ferrites 10 and 12 as described above are canceled out, and because the monocrystal ferrites 9 and 11 of the magnetic cores 1 and 2 undergo only small magnetic deformations, the contact noise arising from the monocrystal ferrites 9 and 11 can be further suppressed.

As a result, the magnetic head of this example can be suitably used for replay because it allows a high output for replay with a low noise.

Furthermore, with the magnetic head of this example, because the surfaces of the monocrystal ferrite members of the composite ferrite composing the magnetic cores 1 and 2 takes VHS orientation, a still higher output for replay with a lower noise can be ensured.

Still further, with the magnetic head of this example, when the fusion glass to be used as a bond between the pair of the magnetic cores is so chosen as to give an optimal linear thermal expansion coefficient, distortions associated with fusion by molten glass can be minimized, which allows a still higher output for replay with a lower noise.

Figure 3:
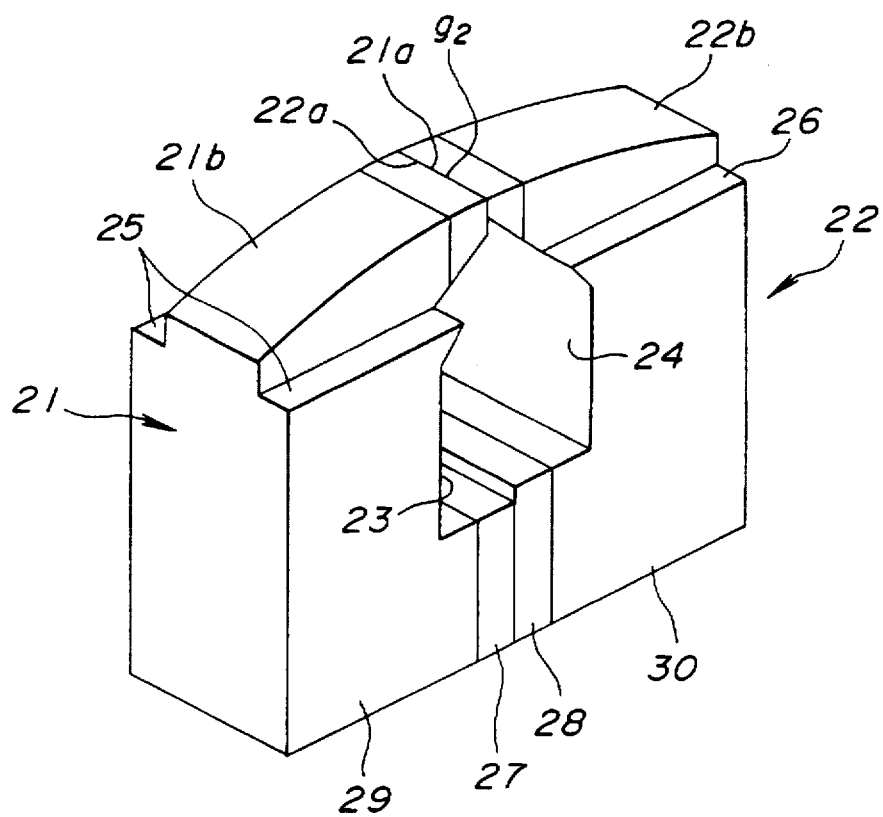
FIG. 3 gives a perspective view of another example of magnetic head according to this invention schematically drawn.

This invention, besides the example described above, can also be applied to other types of magnetic head as will be discussed below. Let's take one illustrated in FIG. 3 as a second example. The magnetic head of this example has a similar constitution to the first example: a pair of magnetic cores 21 and 22 face each other with a magnetic gap $g_2$ in between, and the cores are bonded into a unity with fusion glass not illustrated here. In this example, the magnetic cores 21 and 22 have, on the same sides with gap-forming surfaces 21a and 22a, grooves 23 and 24 for receiving coils.

The magnetic cores 21 and 22 of this example are also provided with contact surface adjusting corners 25 and 26 which are to adjust the width of medium contacting surfaces 21b and 22b.

We prepared magnetic head samples A to G whose magnetic cores 1 and 2 have been composed of monocrystal ferrites 9 and 11, and polycrystal ferrites 10 and 12 differing in composition as indicated in Table 1, applied the same signals recorded onto the same magnetic tape with the same recording head to the magnetic heads A to G successively for replay, and checked the output and contact noise. The test signals consisted of waves of 8, 16 and 33 MHz, and various outputs were expressed relative to the output derived from the magnetic head sample B.

TABLE 1

|  |  | Composition (mol %) $Fe_2O_3$—ZnO—MnO | Output (8 MHz) | Output (16 MHz) | Output (33 MHz) | Contact noise | $\lambda 100$ ($\times 10^{-6}$) | $\lambda 111$ ($\times 10^{-6}$) |
|---|---|---|---|---|---|---|---|---|
| Magnetic head Samples | A | 52–54-24–26-20–24 | +1.2 dB | +0.6 dB | +0.1 dB | +2.4 dB | −3.1 | +2.9 |
|  | B | 53–55-21–23-22–26 | 0 dB | 0 dB | 0 dB | 0 dB | −4.4 | +4.6 |
|  | C | 51–53-19–21-26–30 | −0.3 dB | −0.9 dB | −3.4 dB | +3.7 dB | −7.0 | +2.3 |
|  | D | 52.5–54.5-18–20-25.5–29.5 | −1.1 dB | −2.0 dB | −4.3 dB | +1.9 dB | −6.5 | +4.9 |
|  | E | 55–57-23–25-18–22 | +0.1 dB | +0.5 dB | +0.6 dB | +7.2 dB | −2.9 | +8.3 |
|  | F | 51–53-26.5–28.5-18.5-22.5 | — | — | — | — | — | — |
|  | G | 49–51-24–26-23–27 | — | — | — | — | −6.8 | +1.5 |

With the magnetic head of this example, the magnetic cores 21 and 22 are composed of composite ferrites in such a manner that their gap-forming surfaces 21a and 22a are made of monocrystal ferrites 27 and 28, and the rest is made of polycrystal ferrites 29 and 30.

Also with the magnetic head of this example, the monocrystal ferrites 27 and 28, and polycrystal ferrites 29 and 30 have the same composition as described above.

As a result, the magnetic head of this example, similarly to the foregoing example, can be suitably used for replay because it allows a high output for replay with a low noise.

Furthermore, with the magnetic head of this example, when the surfaces of the monocrystal ferrite members of the composite ferrite composing the magnetic cores 21 and 22 are allowed to take VHS orientation, a still higher output for replay with a lower noise can be ensured.

Still further, with the magnetic head of this example, when the fusion glass to be used as a bond between the pair of the magnetic cores is so chosen as to give an optimal linear thermal expansion coefficient, distortions associated with fusion by molten glass can be minimized, which allows a still higher output for replay with a still lower noise.

EXAMPLES

The preferred embodiments of this invention will be described below with reference to experimental results.

Experiment 1

We took up at first the composition of ferrite materials to be used for the magnetic cores of the magnetic head, and studied its relationship with the performance of the magnetic head.

With the magnetic head samples A to G, the azimuth angle was set to 10° C., a magnetic tape whose coercive force was $14.8 \times 10^3$ (A/m) was used, and the velocity of the magnetic tape was kept at 18.5 m/s with respect to the magnetic head.

In addition, magnetic distortions in the directions 100 and 111 of monocrystal ferrites 9 and 11 composing the magnetic cores 1 and 2 of the magnetic head sample were measured, and the results were added in Table 1. The magnetic head samples F and G, however, were so disabled in certain functions (inductance, etc.) that the necessary parameters could not be determined.

Figure 4:
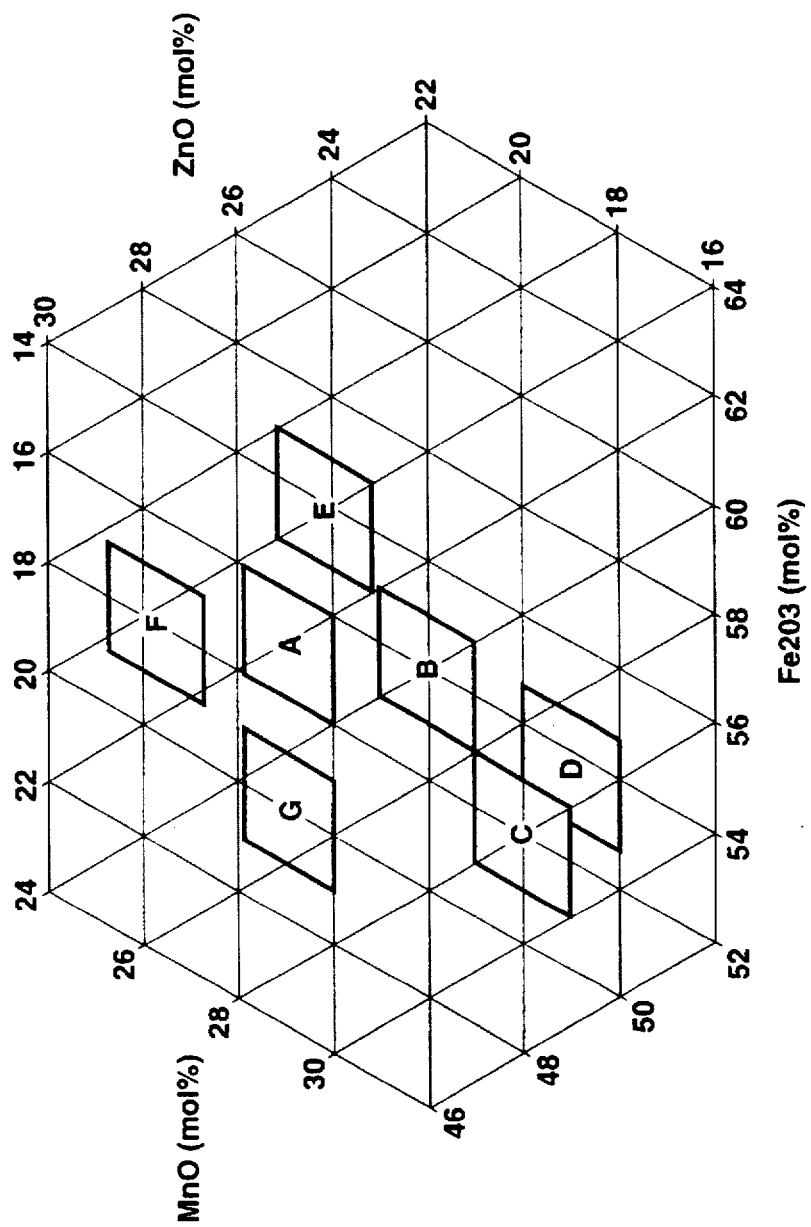
FIG. 4 shows a three-dimensional system upon which plotted are the composition ranges of individual magnetic head samples.

The composition of each magnetic head sample is plotted in a three-dimensional system as shown in FIG. 4. The quadrangle designated as A in FIG. 4 represents the range which the composition of the magnetic head sample A can take, the quadrangle designated as B in FIG. 4 represents the range which the composition of the magnetic head sample B can take, the quadrangle designated as C in FIG. 4 represents the range which the composition of the magnetic head sample C can take, the quadrangle designated as D in FIG. 4 represents the range which the composition of the magnetic head sample D can take, the quadrangle designated as E in FIG. 4 represents the range which the composition of the magnetic head sample E can take, the quadrangle designated as F in FIG. 4 represents the range which the composition of the magnetic head sample F can take, and the quadrangle designated as G in FIG. 4 represents the range which the composition of the magnetic head sample G can take.

Figure 5:
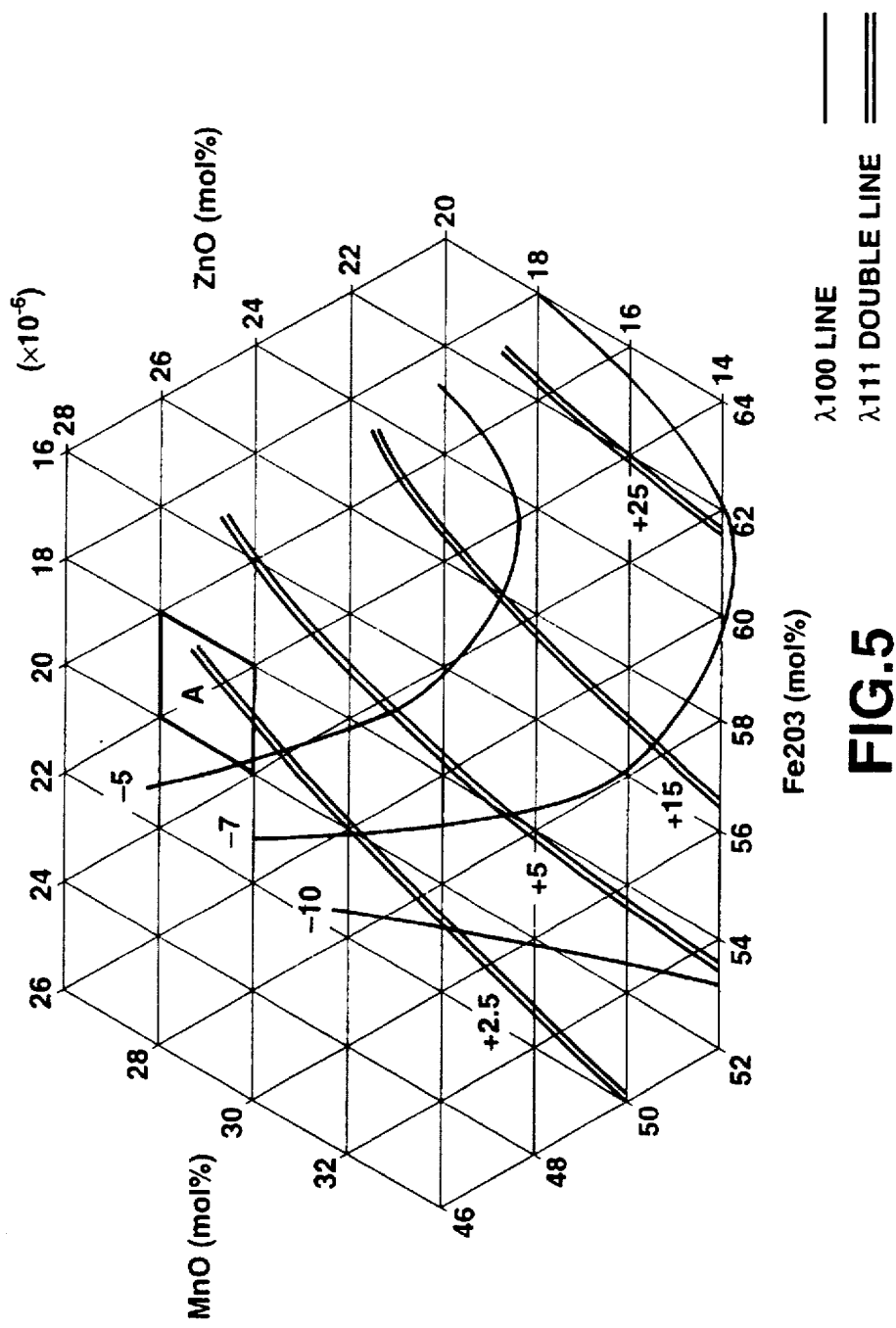
FIG. 5 shows a three-dimensional system which indicates the relationship between changes in composition of the magnetic head sample and the magnetic distortions it undergoes.

Changes in ferrite composition and the resulting magnetic distortions were studied and plotted in another three-dimensional system as shown in FIG. 5. The single solid lines represent magnetic distortions in the direction 100, and the duplicate lines those in the direction 111. The figure attached to each line indicates the magnitude of distortion ($\times 10^{-6}$). A single solid line or a duplicate line is obtained by connecting the dots of the compositions that present a given magnetic distortion in the direction 100 or 111, respectively. The quadrangle A in FIG. 5 represents the range which the composition of the magnetic head A can take.

It was recognized from the comparison of Table 1 and FIG. 4 that, the magnetic head sample F which is, though similar in contents of $Fe_2O_3$ and MnO to the sample A or the magnetic head sample according to this invention, different in ZnO content, and the magnetic head sample G which is, though similar in contents of ZnO and MnO to the sample A, different in $Fe_2O_3$ content can both be used as a head but scarcely have a magnetic potency; and for them to be magnetic, it is necessary to place the upper limit of ZnO content close to 26 mol % and the lower limit of $Fe_2O_3$ content close to 52 mol %.

It was also recognized that the magnetic head sample E which is, though similar in contents of MnO and ZnO to the sample A or the magnetic head sample according to this invention, different in $Fe_2O_3$ content, gives a big contact noise, and to suppress the noise within a satisfactory level it is necessary to place the upper limit of $Fe_2O_2$ content close to 54 mol %.

It was further recognized that the magnetic head sample B which is, though similar in contents of $Fe_2O_3$ and MnO to the sample A or the magnetic head sample according to this invention, different in ZnO content, and the magnetic head samples C and D which are, though similar in content of $Fe_2O_3$ to the sample A, different in MnO and ZnO contents all give a low output; and to get a sufficiently big output from them, it is necessary to place the lower limit of ZnO content close to 24 mol %.

It was still further recognized from FIG. 5 that a magnetic head included within the rectangle A or the range which the composition of the magnetic head sample according to this invention can take gives smaller magnetic distortions in both directions 100 and 111.

From these observations it was concluded that, when composite ferrites composing the magnetic cores of the magnetic head are allowed to take the composition as specified by this invention, the resulting magnetic head gives a magnetic permeability effective as well for low frequency bands, and a low saturation level of magnetization, thereby to reduce magnetic distortions often encountered with monocrystal ferrites, so that the resulting output for replay becomes high, and the contact noise become slow.

Experiment 2

Next, we took up the surface orientation of monocrystal ferrites of the magnetic cores of a magnetic head, and the linear thermal expansion coefficient of fusion glass, and studied their relationships with the performance of the resulting magnetic head.

Thus, we prepared a magnetic head sample H which had the same geometrical configuration with the magnetic head sample A, except that its monocrystal ferrites had a different surface orientation, a second magnetic head sample I which had the same geometrical configuration with the magnetic head sample A except that its fusion glass had a different linear thermal expansion coefficient, and the third magnetic head sample J which had the same configuration with the magnetic head sample H except that its fusion glass had a different linear expansion coefficient, and measured outputs from them in the same manner as in Experiment 1.

With the magnetic head samples H and J, the surface orientation of monocrystal ferrites was allowed to take so-called β-direction: a medium contacting surface corresponds to surface 110, gap forming surfaces to surface 100, and main magnetic flux passing surface to surface 110.

Further, with the magnetic head samples A and H, fusion glass was so chose as to give a linear thermal expansion coefficient less by $20 \times 10^{-7} - 26 \times 10^{-7}$ than that of the composite ferrites composing the magnetic cores at temperatures ranging from 100°–350° C., and with the magnetic head samples I and J, fusion glass was so chose as to give a linear thermal expansion coefficient less by $12 \times 10^{-7} - 18 \times 10^{-7}$ than that of the composite ferrites composing the magnetic cores at temperatures ranging from 100°–350° C.

It should be noted here that the two kinds of fusion glass are the same in physical properties (viscosity, softening point, transition point, etc.) other than the linear thermal expansion coefficient.

TABLE 2

|  |  | Surface orientation of monocrystal ferrites | Difference in linear thermal expansion coefficient between composite ferrite & fusion glass ($\times 10^{-7}$) | Output (8 MHz) | Output (16 MHz) | Output (33 MHz) |
| --- | --- | --- | --- | --- | --- | --- |
| Magnetic head Samples | A | VHS direction | 20–26 | +1.2 dB | +0.6 dB | +0.1 dB |
|  | H | β direction | 20–26 | −0.2 dB | −2.3 dB | −5.5 dB |
|  | I | VHS direction | 12–18 | +0.1 dB | −0.2 dB | −2.8 dB |
|  | J | β direction | 12–18 | −2.8 dB | −4.9 dB | −9.2 dB |

It was recognized from Table 2 that when the surface orientation of monocrystal ferrites is allowed to correspond with VHS direction, the resulting magnetic head gives a higher output than does a magnetic head wherein monocrystal ferrites have a surface orientation corresponding with β direction. Further, when the fusion glass which acts as a bond between the pair of magnetic cores is allowed to have a linear thermal expansion coefficient as specified in this invention, distortions associated with fusion by molten glass can be minimized, which allows a still higher output for replay. Furthermore, when not only the surface orientation of monocrystal ferrites is allowed to correspond with VHS direction, but the fusion glass is allowed to have a linear thermal expansion coefficient at temperatures from 100°–350° C. less by $20\times10^{-7}$–$26\times10^{-7}$ than that of composite ferrites composing the magnetic cores, the resulting magnetic head gives a still higher output for replay.

As is evident from above description, because the magnetic head of this invention is made of magnetic cores composed of composite ferrites which contain 52–54 mol % of $Fe_2O_3$, 24–26 mol % of ZnO and 20–24 mol % of MnO, it has a low saturation level of magnetization with small magnetic distortions. Such composition ensures a sufficient magnetic permeability even to low frequency bands of magnetic flux. With these features, the magnetic head of this invention can give a high output for replay.

Further, with the magnetic head of this invention, because the magnetic cores are made of composite ferrites which have been composed of monocrystal and polycrystal ferrites, the disadvantages inherent in monocrystal and polycrystal ferrites as described above are canceled out, and because the monocrystal ferrites of the magnetic cores undergo only small magnetic deformations, the contact noise arising from the monocrystal ferrites can be further suppressed.

Furthermore, with the magnetic head of this example, because the surface orientation of monocrystal ferrites of the composite ferrite composing the magnetic cores is allowed to correspond with VHS orientation, a still higher output for replay with a lower noise can be ensured.

Still further, with the magnetic head of this example, when the fusion glass to bond the magnetic cores is so chosen as to give an optimal linear thermal expansion coefficient, distortions associated with fusion by molten glass can be minimized, which allows a still higher output for replay with a lower noise.

As a result, the magnetic head of this invention can be suitably used for replay because it allows a high output with a low noise.

What is claimed is:

1. A magnetic head comprising a pair of magnetic cores facing each other with a magnetic gap in between and bonded together with fusion glass, wherein, the magnetic cores are made of ferrites containing 52–54 mol % of $Fe_2O_3$, 24–26 mol % of ZnO, and 20–24 mol % of MnO, each of the magnetic cores is made of a composite ferrite which consists of monocrystal ferrites and polycrystal ferrites bonded together with a gap forming portion being composed of a monocrystal ferrite, the monocrystal ferrites have a VHS orientation, a contact surface of the monocrystal ferrites with a magnetic recording medium has a (211) surface, the magnetic gap forming surfaces have a (111) surface, and a main magnetic flux passing surface has a (110) surface, and the fusion glass for bonding the magnetic cores together has a linear thermal expansion coefficient less by $20\times10^{-7}$–$26\times10^{-7}$ than that of the ferrite members constituting the magnetic cores at temperatures ranging from 100°–350° C.

* * * * *